No. 637,501. Patented Nov. 21, 1899.
W. G. CLASSON.
SURVEYOR'S LEVELING ROD ATTACHMENT.
(Application filed Oct. 24, 1898.)
(No Model.)
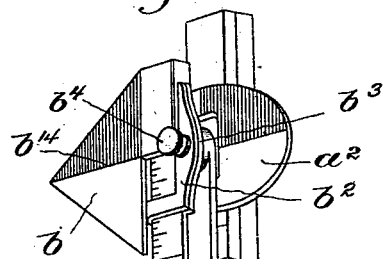
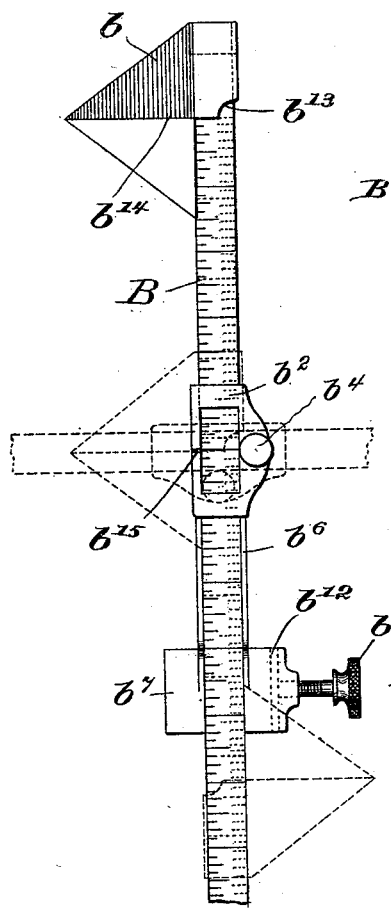
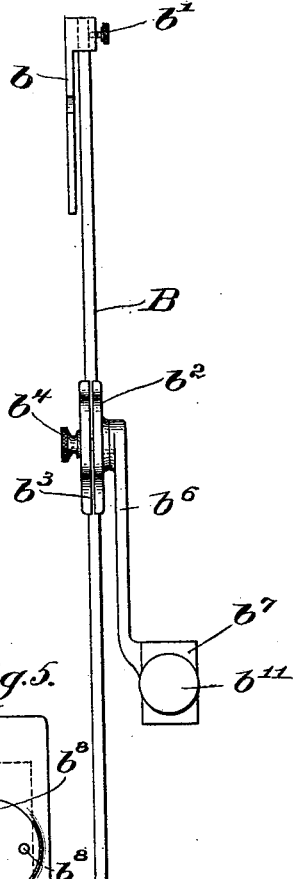
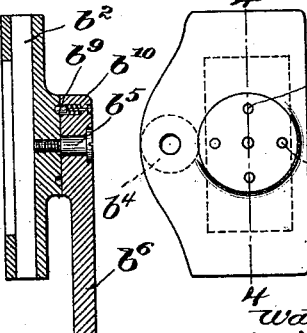
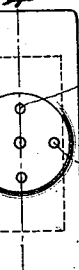
Witnesses:
Fred S. Greenleaf
Thomas J. Drummond
Inventor:
Walter G. Classon,
by Crosby & Gregory
atty's.

UNITED STATES PATENT OFFICE.

WALTER G. CLASSON, OF FITCHBURG, MASSACHUSETTS, ASSIGNOR TO EDWARD G. SOLTMANN, OF NEW YORK, N. Y.

SURVEYOR'S LEVELING-ROD ATTACHMENT.

SPECIFICATION forming part of Letters Patent No. 637,501, dated November 21, 1899.

Application filed October 24, 1898. Serial No. 694,363. (No model.)

*To all whom it may concern:*

Be it known that I, WALTER G. CLASSON, of Fitchburg, county of Worcester, State of Massachusetts, have invented an Improvement in Surveyors' Leveling-Rod Attachments, of which the following description, in connection with the accompanying drawings, is a specification, like letters on the drawings representing like parts.

My invention is an improvement in surveyors' instruments, being particularly intended for use in leveling, and has for its main object the provision of an auxiliary device capable of being attached to a usual leveling-rod, (or any other rod, for that matter,) said device enabling the surveyor to ascertain automatically the various measurements or distances above and below the datum-line.

My invention may be used also in the same manner as the usual leveling-rod is used.

The various details of construction and manner of using my improvement will be pointed out in the course of the following description, reference being had to the accompanying drawings, illustrative of a preferred embodiment thereof, and the invention will be more particularly defined in the appended claims.

In the drawings, Figure 1 is a perspective view of a device embodying my invention attached in operative position to a usual surveyor's leveling-rod. Fig. 2 is a fragmentary view of the device in front elevation, indicating by dotted lines different positions assumed in use. Fig. 3 shows the same in side elevation. Figs. 4 and 5 are respectively a central vertical section and a rear elevation of the slide-clamp.

I have herein shown my improvement as attached to a usual leveling-rod A, shown as comprising a lower section $a$ and upper section $a'$, the latter preferably carrying a usual target $a^2$, the rod being graduated, as usual, in tenths and hundredths.

As is well known, the various measurements in leveling are found customarily by ascertaining the relation of the various readings of the rod to an original point of reference on the rod, determined by the position and height of the transit or other instrument used, the measurements being the difference between the sightings and this point, either above or below, as the case may be; but inasmuch as this involves a considerable process of adding and subtracting and as the various amounts are usually fractional mistakes are liable to occur. My invention, however, avoids the possibility of any mistake, as the reading itself gives the correct measurement and preferably gives it in inches.

Referring to the drawings it will be seen that I provide a ruler or auxiliary rod B, having at its upper end a target $b$, preferably removably secured thereto by suitable means, as a set-screw $b'$, said ruler being carried in a slide or clamp $b^2$, shown as split at $b^3$ along one edge and arranged to be clamped together by a thumb-screw $b^4$. The clamp $b^2$ is pivoted at its rear side by a pivot $b^5$, journaled in the free upper end of an arm or bracket $b^6$, the latter having at its lower end a clamp $b^7$, by means of which the attachment may be secured to the rod A or to any other rod or pole or convenient support.

Preferably the slide $b^2$ and the adjacent face of the arm $b^6$ have means for holding them in desired adjustment, said means being herein shown in the form of sockets or recesses $b^8$ in the back side of the slide and a locking-pin $b^9$, held forward by a spring $b^{10}$, carried in the bracket $b^6$.

The clamp $b^7$ is made to embrace the rod or other support A on three sides and has a thumb-screw $b^{11}$, working through one side thereof and having at its inner end a head or washer $b^{12}$ to bear against the support to which it may be clamped.

The arm or bracket $b^6$ is made sufficiently long to accommodate the device to the various forms and styles of targets $a^2$ which are found in different kinds of leveling-rods, in order that the zero-mark of the ruler B may be brought into alinement with the intersection of the lines of the target $a^2$, said intersection being shown in Fig. 1 as in alinement with the set-screw $b^4$, the target $b$ being also shown as cut away at $b^{13}$, in order that the line $b^{14}$ of the target $b$ may also be brought into proper alinement.

The slide $b^2$ has a zero-mark, herein shown as at $b^{15}$.

The ruler or auxiliary rod B preferably has graduations on the front side thereof in inches, as shown in full lines, Fig. 2, and on the reverse side thereof in tenths and hundredths of feet, as shown in dotted lines in Fig. 2, for a purpose presently to be described.

It will be understood that the various relations of the parts and the parts themselves may be considerably varied within the spirit and scope of my invention, as will appear more fully from the following description of the various purposes of the different parts and the manner of their use.

It being supposed that the surveyor is about to run a level by the aid of my improvement in connection with a usual surveyor's rod, he will first clamp the device to the rod A, as shown in Fig. 1, by setting up the thumb-screw $b^{11}$ until the parts are in rigid position. It is not essential that my attachment should be fixed on the rod A so as to bring the zero-mark $b^{15}$ of the slide in alinement with the target $a^2$, although that will be preferable, doubtless, with most surveyors, but it is merely essential that the attachment should be adjusted so as to bring its zero-mark in accord with the datum-line. The attachment having thus been adjusted, the rodman now simply slides the rod B up until the transit-man sights the target $b$, whereupon the corresponding reading on the rod B will indicate in inches the exact distance from the datum-line, or if the reading is below the datum-line instead of above the rod B is simply rotated on its pivot $b^5$ and then slid downward in the slot $b^2$. So, likewise, if it is desired to take an offset measurement the rod B is turned into a horizontal position, as shown in dotted lines, Fig. 2, and the readings are taken as before. It will thus be seen that the surveyor is relieved entirely of all the tedious figuring heretofore necessary, inasmuch as the various readings noted down by the rodman constitute the measurements themselves.

I wish it understood that my invention is not restricted in its use to the particulars above mentioned, but that it has a wide range of usefulness. For instance, it may be used itself as the surveyor's leveling-rod simply by being attached to any rod or pole convenient to support it, the readings in such case being preferably taken from the reverse side of the ruler B, inasmuch as it is customary and preferable to have the readings of the regular leveling-rod in decimals. Various other uses will suggest themselves to those skilled in the art.

Having fully described my invention, what I claim, and desire to secure by Letters Patent, is—

1. The combination with a leveling-rod, of a graduated ruler movable longitudinally relative to said rod and provided with means for automatically determining the measurements from the datum-line, and a connection between said rod and graduated ruler, provided with a zero-mark and adjustable to bring said mark into accord with the datum-line, substantially as described.

2. The herein-described attachment for use in leveling, comprising a bracket or support provided with securing means, and a slide carried thereby, in combination with a rod or a ruler reciprocable in said slide, and carrying a target at its outer end, substantially as described.

3. The herein-described attachment for use in leveling, comprising a bracket or support provided with securing means, and a slide pivoted thereon, in combination with a graduated rod or a ruler reciprocable in said slide, and provided with a target at the end having the low denominations, substantially as described.

4. The herein-described attachment for use in leveling, comprising a bracket or support provided with securing means, and a slide pivoted thereon, and means for locking said slide in adjusted position on said supporting-bracket, and a rod or ruler for said slide, substantially as described.

5. The herein-described attachment for use in leveling, comprising a bracket or support provided with securing means, and a slide carried thereby, in combination with a rod or a ruler reciprocable in said slide, said rod or ruler having at one end thereof a target, and graduations beginning with "0" at said target end, substantially as described.

6. The herein-described attachment for use in leveling, comprising a bracket or support provided with securing means, and a slide carried thereby, in combination with a rod or a ruler reciprocable in said slide, said rod or ruler having at one end thereof a target, and graduations in denominations of inches beginning with "0" at said target end, substantially as described.

7. The herein-described attachment for use in leveling, comprising a bracket or support provided with securing means, and a slide carried thereby, in combination with a rod or a ruler reciprocable in said slide, said rod or ruler having at one end thereof a target, and graduations in denominations of inches beginning with "0" at said target end on one side, and graduations on the opposite side in surveyors' measure, substantially as described.

In testimony whereof I have signed my name to this specification in the presence of two subscribing witnesses.

WALTER G. CLASSON.

Witnesses:
ALBERT B. HASKELL,
WILLIAM K. BAILEY.